(12) United States Patent
Haupt et al.

(10) Patent No.: US 6,584,772 B2
(45) Date of Patent: Jul. 1, 2003

(54) METHOD OF LIMITING CHARGE PRESSURE

(75) Inventors: Frank Haupt, Winterbach (DE); Lothar Schmid, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/012,744

(22) Filed: Nov. 5, 2001

(65) Prior Publication Data

US 2002/0088226 A1 Jul. 11, 2002

(30) Foreign Application Priority Data

Nov. 4, 2000 (DE) .......................................... 100 54 843

(51) Int. Cl.$^7$ ................................................ F02B 33/44
(52) U.S. Cl. .......................................... 60/602; 60/605.1
(58) Field of Search ................................ 60/602, 605.1

(56) References Cited

U.S. PATENT DOCUMENTS

| | | | | | |
|---|---|---|---|---|---|
| 4,445,336 A | * | 5/1984 | Inoue | .......................... | 60/605.1 |
| 5,526,266 A | * | 6/1996 | Rutan et al. | ................... | 60/602 |
| 6,050,093 A | * | 4/2000 | Daudel et al. | ................. | 60/602 |
| 6,089,018 A | * | 7/2000 | Bischoff et al. | ............... | 60/602 |
| 6,155,049 A | * | 12/2000 | Bischoff | ....................... | 60/602 |
| 6,263,673 B1 | * | 7/2001 | Schmidt et al. | ................ | 60/612 |
| 6,401,457 B1 | * | 6/2002 | Wang et al. | .................... | 60/602 |
| 2002/0166322 A1 | * | 11/2002 | Weinreuter | ................... | 60/602 |

FOREIGN PATENT DOCUMENTS

| | | | | |
|---|---|---|---|---|
| DE | 196 04 344 | | 8/1997 | |
| DE | 198 08 832 | | 9/1999 | ................... 60/602 |

* cited by examiner

Primary Examiner—Thomas Denion
Assistant Examiner—Thai-Ba Trieu
(74) Attorney, Agent, or Firm—Kenyon & Kenyon

(57) ABSTRACT

In a method of limiting the charge pressure of an internal combustion engine charged using an exhaust gas turbocharger, a control unit performs an actual value/setpoint value comparison of a controlled variable with a predefined limit value and generates or limits actuating signals for an actuator drive of an actuator acting upon the controlled variable. The setpoint value is taken from a characteristic map memory as a function of the instantaneous operating state of the internal combustion engine. In order to allow the internal combustion engine to operate at the highest possible charge pressure and corresponding power output, measured values of the temperature and of the pressure upstream and downstream, respectively, from a compressor of the exhaust gas turbocharger are used for reading the limit value from the characteristic map memory.

6 Claims, 2 Drawing Sheets

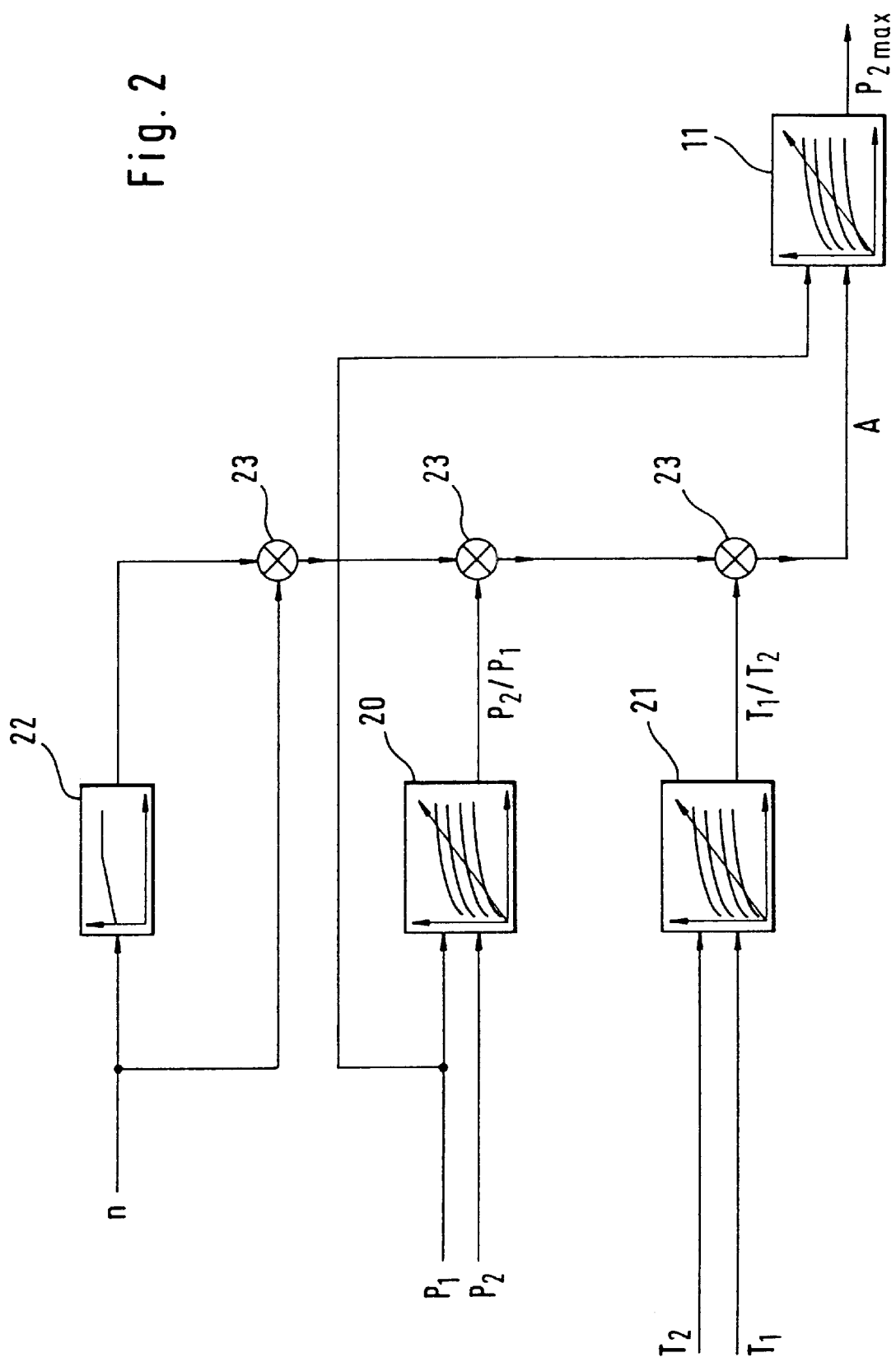

METHOD OF LIMITING CHARGE PRESSURE

FIELD OF THE INVENTION

The present invention relates to a method of limiting the charge pressure of an internal combustion engine charged by an exhaust gas turbocharger.

BACKGROUND INFORMATION

As is conventional, an exhaust gas turbocharger includes a turbine driven by the exhaust gas stream of the internal combustion engine and a compressor driven by the turbine, which pre-compresses fresh air for the internal combustion engine as a function of the charger rotational speed. The dynamic pressure of the exhaust gas stream upstream from the turbine is converted by the turbocharger into charge pressure according to the pressure conversion ratio between turbine and compressor. A higher charge pressure results in a greater air throughput of the engine, increasing its power output. The charge pressure, however, cannot be increased indefinitely to increase the power of the engine. The allowable operating range of the charger compressor is limited by the pumping limit and the maximum allowable rotational speed of the exhaust gas turbocharger.

German Published Patent Application No. 198 08 832 describes a method of controlling the charge pressure in which a control unit performs an actual/setpoint value comparison of the charge pressure with a predefined setpoint value and adjusts the actual value of the charge pressure by controlling a variably adjustable turbine geometry of the charger turbine accordingly. In the method, the setpoint value of the charge pressure is taken from a characteristic map memory as a function of the instantaneous operating state of the engine. The data field for the allowable charge pressure is determined in advance and is stored in the characteristic map memory from which it is read as needed.

In the conventional method, the applied charge pressure setpoint values are determined with a greater safety margin with respect to the pumping limit of the compressor and the rotational speed limit of the exhaust gas turbocharger in order to prevent the limits from being exceeded. An undesirable proximity to the limit value of the exhaust gas turbocharger may result from a plurality of operating conditions of the internal combustion engine, for example, in the event of a changed ambient pressure of the engine, different air temperatures, or when particles accumulate in the air filter after a relatively long operating time. In order to prevent the turbocharger from exceeding its limit values and being damaged due to a clogged air filter in the induction tract of the engine, design measures have been used. Thus, for example, German Published Patent Application No. 196 04 344 describes a bypass to the air filter, which is to be opened as a function of the intake pressure upstream from the air filter.

It is an object of the present invention to provide a method of limiting the setpoint charge pressure, which may allow the internal combustion engine to be operated with the highest possible charge pressure while preventing the turbocharger limits from being exceeded.

SUMMARY

The above and other beneficial objects of the present invention are achieved by providing a method as described herein.

According to the present invention, measured values of the temperature and of the pressure upstream and downstream from the compressor of the exhaust gas turbocharger are used for reading the limit value of the controlled variable from the characteristic map memory. These temperature and pressure values are relevant to the proximity of the exhaust gas turbocharger used, to the pumping and rotational speed limits. The maximum possible value of the controlled variable may be predefined with a lower safety margin than previously by consistently detecting these physically relevant variables.

The measured values of the temperature and the measured values of the pressure may be set in relationship to one another and the limit value of the controlled variable is determined from the characteristic map memory using the ratios formed in this manner. The ratios may be formed from the quotients of the respective measured values. In this manner, when the engine is operated at maximum charge pressure close to the charger rotational speed limit or pumping limit of the exhaust gas turbocharger, it may be ensured that the effect of different air temperatures, a possible particle accumulation in the air filter, and other variables having an influence on the operating characteristics and the margin to the charger limits is determined and taken into account.

The pressure and temperature of the intake air may be measured in an air line to the compressor, downstream from an air filter arranged in the clean air line. When measuring at the largest cross-section of the air line, the dynamic portion of the measured pressure value is negligibly small. The pressure drop between the point of measurement and the compressor inlet has barely any effect on the determination of the maximum possible charge pressure and is eliminated as an approximate function of the flow rate in determining the maximum charge pressure values.

In order to read the limit value of the controlled variable from the characteristic map memory, and address value is determined, which may be calculated from the ratios of the measured pressure values and of the measured temperature values and of a measured value of the rotational speed of the internal combustion engine weighted with the volumetric efficiency. When reading the characteristic map memory using the address value, the measured value of the pressure upstream from the compressor, i.e., the intake pressure down stream from the air filter, is taken into account. In an example embodiment of the method according to the present invention, the charge pressure forms the controlled variable of turbine geometry, the maximum allowable charge pressure being represented as a function of the measured pressure value upstream from the compressor and the address value in the case of the limitation according to the present invention. The address value depends on the rotational speed of the compressor and is automatically weighted with the instantaneous volumetric flow rate of the charge air for the internal combustion engine.

An example embodiment of the present invention is explained in detail below with reference to the drawings.

BRIEF DESCRIPTION OF THE DRAWINGS

FIG. 2 is a circuit diagram for determining the maximum allowable charge pressure.

DETAILED DESCRIPTION

Figure 1:
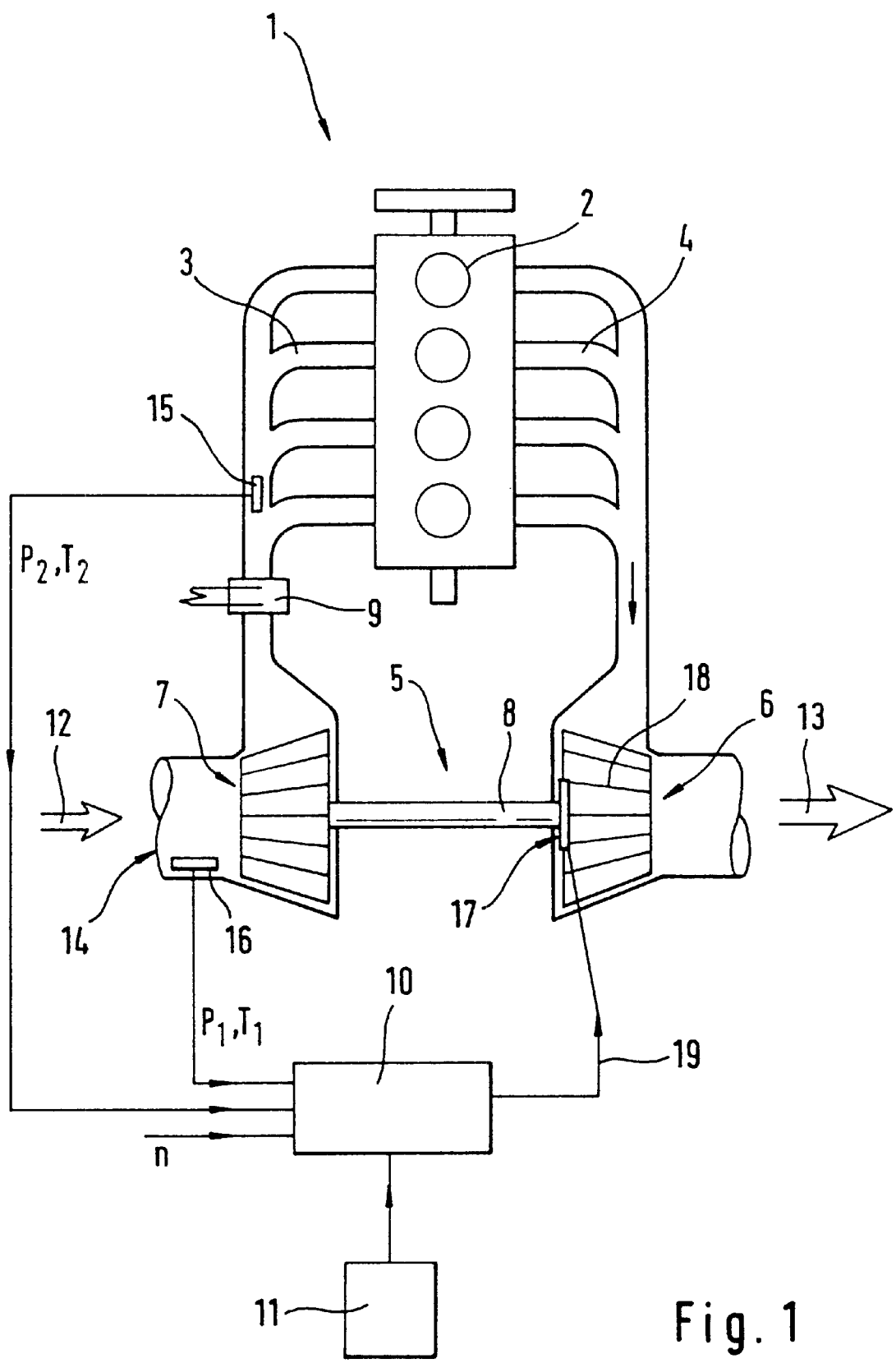
FIG. 1 schematically illustrates an internal combustion engine charged using an exhaust gas turbocharger.

FIG. 1 illustrates an internal combustion engine 1 which is charged by an exhaust gas turbocharger 5. A turbine 6 of exhaust gas turbocharger 5 is arranged in exhaust piping 4 of internal combustion engine 1 and is driven by the combined exhaust gas 13 of all cylinders 2 of internal combustion engine 1. Turbine 6 rotatingly drives a compressor 7 which is arranged in induction tract 3 of internal combustion engine 1 using a rigid connection via a charger shaft 8. Compressor 7 aspirates fresh air via an intake line 14 and conveys compressed charge air to cylinders 2 of internal combustion engine 1. A charge air cooler 9 is arranged in induction tract 3 between compressor 7 and cylinders 2.

The charge pressure is controlled by a control unit 10, which performs an actual/setpoint value comparison of the prevailing charge pressure with a predefined setpoint value. The actual value of the charge pressure is measured by a measuring probe 15 in induction tract 13 of internal combustion engine 1. Control unit 10 controls an actuator acting on the charge pressure, which is a variably adjusted turbine geometry 18 of turbine 6 of exhaust gas turbocharger 5 in the example embodiment. As an alternative, the present invention may also be implemented using a waste-gate controlled turbine. Depending on the result of the actual/setpoint value comparison of the charge pressure, control unit 10 generates control signals 19 for an actuator drive 17 of variably adjustable turbine geometry 18 to adjust the charge pressure to the predefined setpoint value. The charge pressure setpoint value is limited by the maximum allowable charge pressure, at which the pumping limit and the rotational speed limit of exhaust gas turbocharger 5 have not yet been reached. The charge pressure limit value is taken from a characteristic map memory 11 where data fields are stored with optimum values determined in advance in test bench tests.

In order to read the limit value from characteristic map memory 11, according to the present invention, besides rotational speed n of internal combustion engine 1, control unit 10 draws upon measured values of temperature $T_1$, $T_2$, and of pressure $P_1$, $P_2$ upstream and downstream, respectively, from compressor 7. In order to determine pressure $P_2$ and temperature $T_2$ of the charge air, a measuring probe 15 is positioned in induction tract 3 of internal combustion engine 1 downstream from charge air cooler 9, which is connected in signal-transmitting fashion to control unit 10. An additional measuring probe 16 is positioned in intake line 14 to compressor 7, which measures pressure $P_1$ and temperature $T_1$ of aspirated fresh air 12 and inputs them into control unit 10.

The evaluation of the input variables of control unit 10 for limiting the charge pressure setpoint value to be adjusted is described below with reference to FIG. 2. A data field, in which the setpoint value of maximum charge pressure $P_{2max}$ to be read is set in relationship with an address value A and the pressure upstream from the compressor, is stored in the characteristic map memory. In order to determine this value, the control unit has a pressure-related characteristic map 20, a temperature-related characteristic map 21, and a rotational speed characteristic curve 22, the output variables of which jointly form address value A. Ratios $P_2/P_1$, $T_1/T_2$, which are formed from the quotients of the respective measured values, are output variables of pressure characteristic map 20 and temperature characteristic map 21. A ration $P_2/P_1$ of the pressure upstream from the compressor and charge pressure $P_2$ is read from pressure characteristic map 20 and linked with the ratio $T_1/T_2$, which corresponds to measured temperature values $T_2$ and $T_1$. The effect of rotational speed n on the maximum allowable charge pressure is read via a characteristic map value from characteristic curve 22, the values of which correspond to the required air consumption of the internal combustion engine. The three values of air consumption according to rotational speed characteristic curve 22, pressure ration $P_2/P_1$, and temperature ratio $T_1/T_2$ are joined to address value A by gates 23.

What is claimed is:

1. A method of limiting a charge pressure of an internal combustion engine charged by an exhaust gas turbocharger, comprising the steps of:

performing an actual value/setpoint value comparison of a controlled variable with a predefined limit value by a control unit;

one of generating and limiting actuating signals for an actuator drive of an actuator acting upon the controlled variable; and reading the limit value from a characteristic map memory as a function of an instantaneous operating state of the internal combustion engine;

wherein the limit value is read in the reading step in accordance with measured values of temperature and pressure upstream and downstream from a compressor of the exhaust gas turbocharger.

2. The method according to claim 1, further comprising the step of measuring the pressure and temperature of intake air in an air line to the compressor.

3. A method of limiting a charge pressure of an internal combustion engine charged by an exhaust gas turbocharger, comprising the steps of:

performing an actual value/setpoint value comparison of a controlled variable with a predefined limit value by a control unit;

one of generating and limiting actuating signals from an actuator drive of an actuator acting upon the controlled variable;

reading the limit value from a characteristic map memory as a function of an instantaneous operating state of the internal combustion engine, the limit value read in the reading step accordance with measured values of temperature and pressure upstream and downstream from a compressor of the exhaust gas turbocharger;

setting the measured values of the temperature and the pressure in relationship to one another; and determining the limit value of the controlled variable from the characteristic map memory in accordance with a ratio of the measured values of the upstream temperature to downstream temperature and in accordance with a ratio of the measured values of the downstream pressure to the upstream pressure.

4. The method according to claim 3, further comprising the step of forming the ratios in accordance with quotients of the respective measured values.

5. The method according to claim 3, further comprising the step of determining an address value from the ratios of the measured pressure values and the measured temperature values and from a measured value of a rotational speed of the internal combustion engine, the limit value being read in the reading step in accordance with the address value.

6. The method according to claim 5, wherein the limit value is read in the reading step in accordance with the address value and the measured value of pressure upstream from the compressor.

* * * * *

UNITED STATES PATENT AND TRADEMARK OFFICE
CERTIFICATE OF CORRECTION

PATENT NO. : 6,584,772 B2
DATED : July 1, 2003
INVENTOR(S) : Haupt et al.

It is certified that error appears in the above-identified patent and that said Letters Patent is hereby corrected as shown below:

Column 2,
Lines 44-45, change "down stream" to -- down-stream --;

Column 3,
Line 60, change "ration" to -- ratio --;

Column 4,
Line 5, change "ration" to -- ratio --; and
Line 33, change "from" to -- for --.

Signed and Sealed this

Third Day of August, 2004

JON W. DUDAS
*Acting Director of the United States Patent and Trademark Office*